(12) United States Patent
Haikin et al.

(10) Patent No.: US 6,704,442 B2
(45) Date of Patent: *Mar. 9, 2004

(54) COMPOSITE COLOR TRANSFORMATION USING CUSTOMIZED GAMUT MAPPINGS

(75) Inventors: John S. Haikin, Fremont, CA (US); Todd D. Newman, Palo Alto, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,065

(22) Filed: Nov. 15, 1999

(65) Prior Publication Data

US 2003/0053682 A1 Mar. 20, 2003

(51) Int. Cl.[7] .............................. G06K 9/00; G06K 9/36
(52) U.S. Cl. ....................................... 382/162; 382/276
(58) Field of Search .................................. 382/162, 163, 382/164, 165, 166, 167, 276, 168; 395/131, 164, 162; 358/504, 505, 518, 519, 520, 521, 522, 523; 345/430, 431

(56) References Cited

U.S. PATENT DOCUMENTS

| 4,731,662 A | | 3/1988 | Udagawa et al. ............. 358/75 |
| 5,208,911 A | * | 5/1993 | Newman et al. ............. 395/162 |
| 5,432,906 A | | 7/1995 | Newman et al. ............. 395/162 |
| 5,463,480 A | | 10/1995 | MacDonald et al. ........ 358/520 |
| 5,594,558 A | | 1/1997 | Usami et al. ................ 358/518 |
| 5,657,068 A | | 8/1997 | Ohta ........................... 347/232 |
| 5,712,925 A | | 1/1998 | Ohga .......................... 382/167 |
| 5,786,823 A | * | 7/1998 | Madden et al. ............. 345/431 |
| 5,818,960 A | * | 10/1998 | Gregory, Jr. et al. ....... 382/167 |
| 6,005,968 A | * | 12/1999 | Granger ...................... 382/162 |
| 6,043,909 A | * | 3/2000 | Holub ......................... 358/504 |
| 6,157,735 A | * | 12/2000 | Holub ......................... 382/167 |

OTHER PUBLICATIONS

Jan Morovic, "To Develop a Universal Gamut Mapping Algorithm", Thesis Submitted to the University of Derby, Oct. 1998, Condensed format edition.

* cited by examiner

Primary Examiner—Andrew W. Johns
Assistant Examiner—Amir Alavi
(74) Attorney, Agent, or Firm—Fitzpatrick, Cella, Harper & Scinto

(57) ABSTRACT

A color management system that transforms input image data from an input colorant space to an output colorant space using input and output device appearance transforms and a customizable gamut mapping algorithm. The gamut mapping algorithm is customizable based on the color management session in question, and in particular may be customizable based on the content of the image data, based on a comparison between input device appearance transforms and output device appearance transforms, or based on viewing conditions, output conditions or print media involved. According to the invention, the customizable gamut mapping algorithm is customized based on the current color management session, and the customized gamut mapping algorithm is composited with the input device appearance transform and/or the output device appearance transform thereby yielding one or more transformations that can be applied to the input image data more efficiently than if the transformations (including the gamut mapping algorithm) were applied individually.

14 Claims, 6 Drawing Sheets

US 6,704,442 B2

COMPOSITE COLOR TRANSFORMATION USING CUSTOMIZED GAMUT MAPPINGS

BACKGROUND OF THE INVENTION

1. Field of the Invention

The present invention concerns a color management system in which color transformations including a gamut mapping are composited together into a single color transformation, with the gamut mapping being customized (or tailored) in dependence on characteristics of the current color management session, such as being customized based on the image data being managed, or based on a relationship between input device gamut and output device gamut.

2. Description of the Related Art

Known color management systems transform images from an input colorant space corresponding to an input device into an output colorant space corresponding an output device. First, input image data is transformed into an intermediate color space from the input device colorant space using an input device color appearance transform. The intermediate color space is often referred to as a profile connection space, or PCS, and may be a device independent color space or a perceptual color space. The intermediate representation of the image data is subjected to gamut mapping so as to ensure that all colors in the transformed image data are representable in the output device. Then, the gamut mapped image data is transformed into the output colorant space using an output device color appearance transform. U.S. Pat. No. 5,463,480 to MacDonald describes one such color management system.

The input and output device color appearance transforms are transformations that are often embodied in mathematical expressions or in look-up tables (LUTs) that may be either one-dimensional or multi-dimensional. In the case of a LUT for an input device appearance transform, the LUT stores values in the PCS corresponding to spaced samples in the input device color space. A typical input device appearance transform, corresponding for example to a scanner, stores values in Jch or Jab coordinates (i.e., the CIECAM97s perceptual color space) corresponding to a three-dimensional grid of 9×9×9 samples in each of the red and green and blue components for the scanner. Output device appearance transforms, for example that of a printer, contain corresponding values of the output device colorants (such as cyan, yellow and magenta) based on spaced samples in Jch or Jab coordinates.

One of the more difficult challenges for color management systems is determining how to reproduce colors from the original image that cannot be produced within the gamut of colors on the destination device. "Gamut mapping" is the attempt to map colors in a pleasing way. There are many gamut mapping algorithms in use today, and although they are ordinarily given in the form of mathematical expressions or look-up tables, they also are transformations of colors.

Use of these transformations (i.e., the input and output device appearance transforms and gamut mappings), whether they be LUTs or mathematical expressions or any other form of transformation, requires significant processing power. For example, because LUTs contain only spaced samples, interpolation is necessary to use these LUTs for any one set of image data, since it is unlikely that the image data will contain only values falling exactly at the LUT samples. Interpolation techniques are well known and include, for example, trilinear and tetrahedral interpolation. However, since interpolation must be applied to each and every piece of image data, both forward through the input device appearance transform and out through the output device appearance transform, processing is extensive and time consuming. This is compounded by gamut mapping, which also must be applied against each piece of transformed image data.

U.S. Pat. No. 5,432,906 to Newman proposes one solution to the amount of processing power needed, by creating a composite transform which is equivalent to a sequential application of multiple color transforms from an input color space to an output color space. Since the transforms themselves are composited into a single transform, Newman's proposal lowers data processing overhead because image data need only be transformed through a single composite transform, rather than through multiple transforms.

The Newman proposal is disadvantageous, however, since once the composite transformation has been obtained, it is immutable and cannot be changed based on circumstances of each different color management session. For example, there are many situations in which it is preferable to customize or to tailor the gamut mapping algorithm based on the color management session. As one example, it is often preferable to tailor the gamut mapping algorithm based on the precise nature of the image data. For image data that falls entirely within the output device gamut, the gamut mapping algorithm need not be applied at all; whereas for increasingly out-of-gamut image data, increasingly compressive gamut mappings are applied. However, because the Newman system pre-computes a composite transform, such flexibility is not achievable.

SUMMARY OF THE INVENTION

It is an object of the invention to address the foregoing difficulty by forming a composite transform that incorporates gamut mapping, with the gamut mapping being customized or otherwise tailored for the current color management session. Because the gamut mapping is customized for the current color management session, color effects that would not even have been recognized until after the overall color management session was in place can easily be compensated through customization.

Thus, in one aspect, the invention is a color management system that operates with an input device appearance transform and an output device appearance transform together with a customizable gamut mapping algorithm so as to transform an image from an input colorant space to an output colorant space during a color management session. According to the invention, the gamut mapping algorithm is customized to the color management session in question, and then the gamut mapping algorithm is applied to either the input device appearance transform or the output device appearance transform, or both, so as to result in a composited transform that incorporates a customized gamut mapping.

Examples of suitable gamut mapping algorithms, that are customizable based on a color management session, are gamut mapping algorithms that depend on image data, gamut mapping algorithms that depend on a comparison between input and output device gamuts (such as the GCUSP, CLLIN and CARISMA algorithms), and gamut mapping algorithms that depend on current printing or viewing conditions. Other customizable gamut mapping algorithms may also be used, with customization being dependent upon the current color management session, such as parameterized gamut mapping algorithms whose parameters depend on information from the current color management session, such as information pertaining to the input image, the input device gamut, the output device gamut, or the output conditions such as viewing conditions or recording medium.

For example, the input device appearance transform and/or the output device appearance transform may include gamut boundary descriptors, and the gamut boundary descriptors might be utilized by a parameterized gamut mapping algorithm so as to generate a customized gamut mapping algorithm specific for a transformation from the input device to the output device.

Compositing of the gamut mapping algorithm with other transforms may be a full compositing, so as to yield a single transform from the input colorant space to the output colorant space, or may be a partial compositing, such as a composite transform from the input device space through to gamut-mapped device independent or perceptual color space. In addition, other transformations might also be applied, such as transformations tailored to achieve particular color effects, or to model color appearance.

In one particularly preferred arrangement, direct or indirect results of the input device appearance transform are gamut-mapped with the customized gamut mapping algorithm so as to yield a gamut-mapped composite transformation from input colorant space to a gamut-mapped device independent or perceptual color space. This arrangement is preferred since the input device appearance transform represents all possible input image colors in a compact way. Accordingly, since the input device appearance transform represents all possible image colors in a compact way, customized gamut mapping can be applied more efficiently than if the gamut mapping were applied to input image data transformed through the input device appearance transform. Thus, since the image can be expected to contain multiple occurrences of a large number of colorant values, particularly in the case of computer-generated images, processing according to the invention largely reduces redundant processing.

As an additional preferred embodiment, output device appearance transform can be applied to the foregoing partial composite transform, so as to yield a single composite transform from the input colorant space to the output colorant space in which a gamut mapping algorithm is customized to the particular color management session in question.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color management system that customizes a customizable gamut mapping algorithm (GMA) based on session-specific information of a color management session, prior to compositing the customized gamut mapping algorithm with other color transformations. The present invention can be implemented in color management systems which are used to map color image data from the color space of one device, such as a monitor or a scanner, to the color space of another device, such as a printer. A color management system according to the present invention may be incorporated in an output device driver in a computing device such as a printer driver, it may be embedded in the firmware of an output device such as a printer, or it may be provided in a stand-alone color management application for use on a general purpose computer. It should be understood that the present invention is not limited to these embodiments and that the present invention may be used in other environments in which color management is used.

Figure 1:
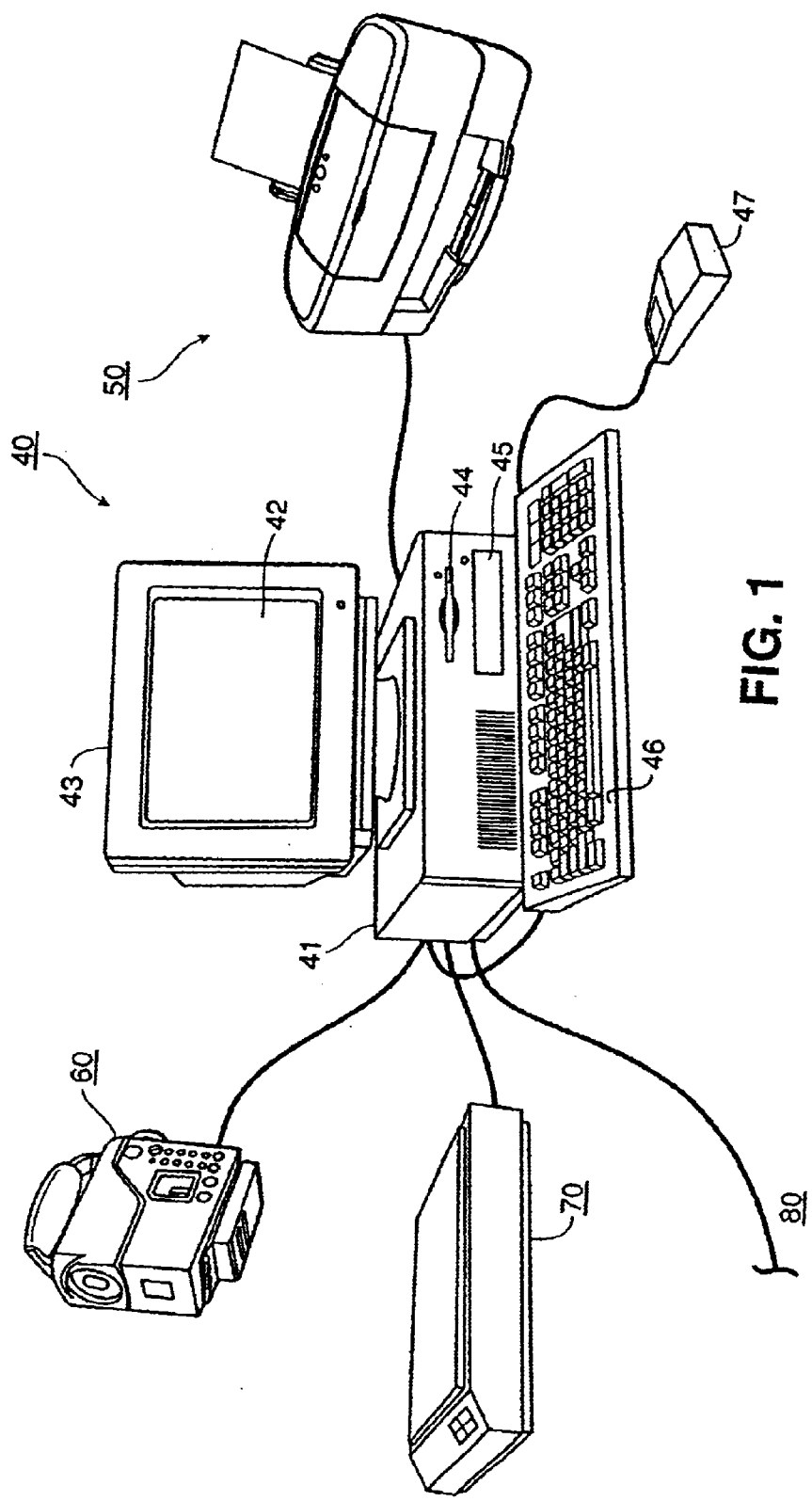
FIG. 1 is a view showing the outward appearance of a representative computing system.

FIG. 1 is a view showing the outward appearance of a representative computing system including computing equipment, peripherals and digital devices which may be used in connection with the practice of the present invention, which in this case is implemented as a stand-alone color management module in the computing system. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium for storing computer-executable process steps, here computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as coated or uncoated paper or transparencies or the like. In addition, image input equipment is provided, such as digital color scanner 70 for scanning documents and images into computing equipment 40 and digital color camera 60 for sending digital images to computing equipment 40. Of course, computing equipment 40 may acquire digital image data from other sources such as a digital video camera or from a local area network or the Internet via network interface bus 80.

Figure 2:
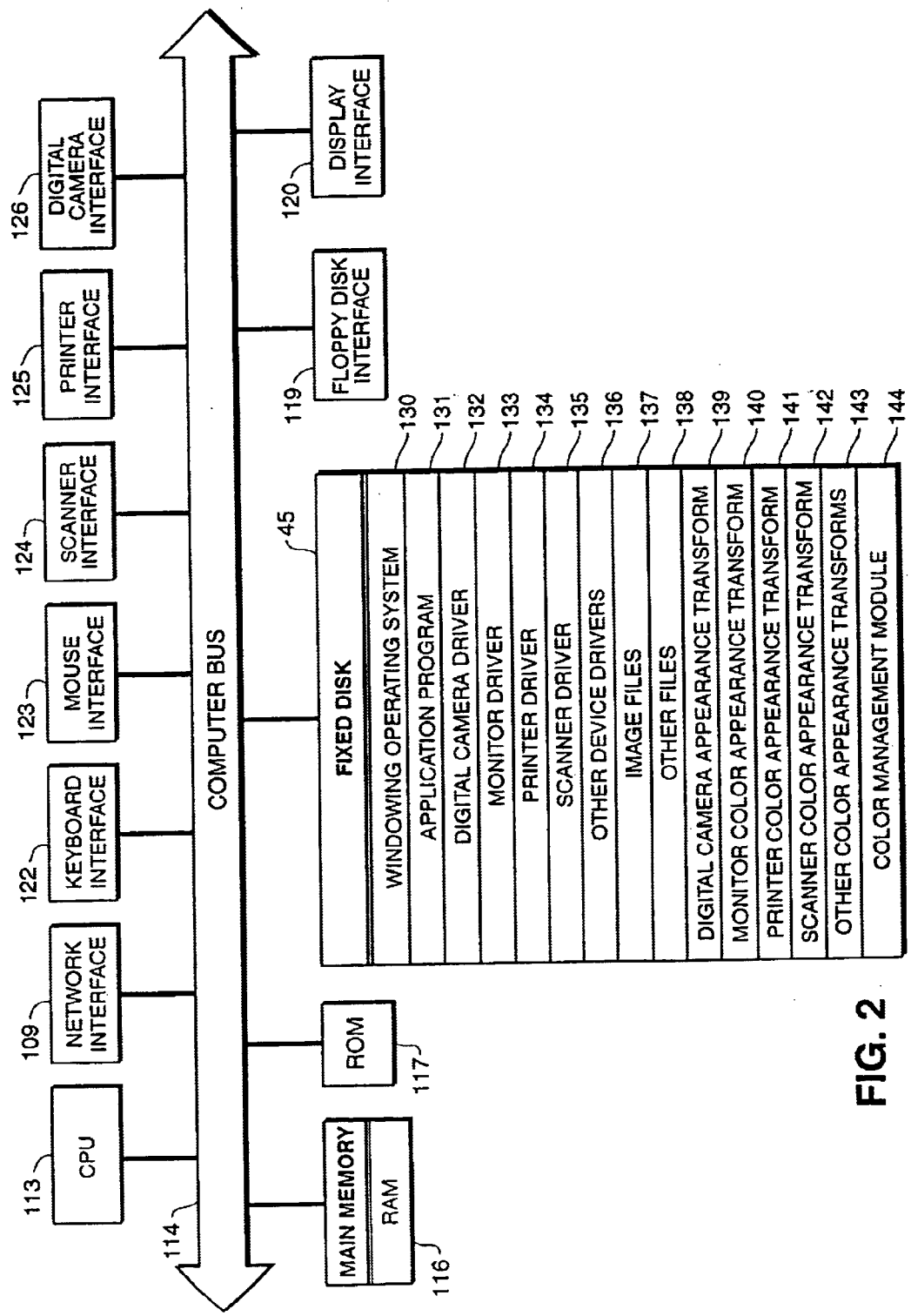
FIG. 2 is a detailed block diagram showing the internal architecture of a host processor of the computing equipment.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that may include an embedded color management module, and plural device drivers that may also include embedded color management modules, including a digital camera driver 132, monitor driver 133, printer driver 134, scanner driver 135, and other device drivers 136. Fixed disk 45 also includes image files 137, other files 138, digital camera color appearance transform 139 for digital camera 60, monitor color appearance transform 140 for monitor 43, printer color appearance transform 141 for printer 50, scanner color appearance transform 142 for scanner 70, and other color appearance transforms 143 for other devices and peripherals (not shown). Each of these device appearance transforms includes a color transformation that characterizes the color attributes of the device in question. Usually, the device appearance transform includes a transformation from a device dependent color space to a device independent color space (for an input device), from a device independent color space to a device dependent color space (for an output device), or both. Suitable device appearance transforms are described in "Color Management In The Graphics Arts And Publishing", by Tony Johnson (Pira International, 1996).

The present invention is preferably performed by computer-executable process steps which are stored on fixed disk 45 for execution by CPU 113, either as an integrated part of a device driver, such as printer driver 134, or as one of application programs 131 for performing image processing. In the present embodiment, the invention is performed by stand-alone color management module (CMM) 144.

Figure 3:
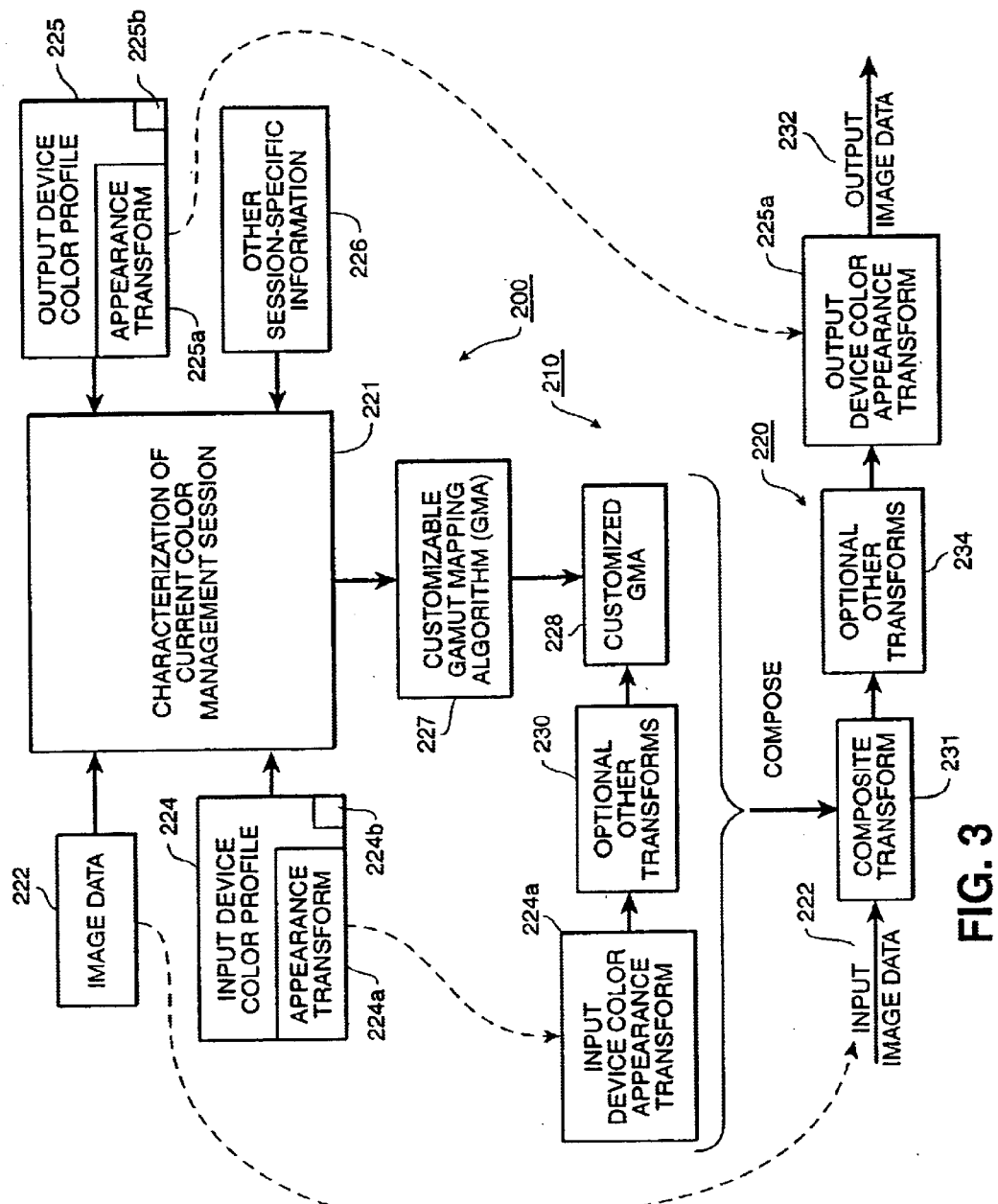
FIG. 3 is a functional block diagram illustrating functionality of a color management system according to the invention.

FIG. 3 is a functional block diagram illustrating functionality of a color management system according to the invention, such as color management module 144. As shown in FIG. 3, color management module 144 operates in three phases of functionality: a customization processing phase 200 during which a customizable gamut mapping algorithm is customized for the current color management session, a pre-processing phase 210 during which the customized gamut mapping algorithm is applied to one or more transforms so as to result in a composite transform that incorporates the customized gamut mapping algorithm, and a data processing phase 220 during which input image data is transformed from its input colorant space through the composite transform together with any other transforms needed to produce output color data in an output colorant space.

In more detail, block 221 characterizes the current color management session based on components that make up the session in question. Those components include one or more of the input image data 222, the input device color profile 224 which includes appearance transform 224a, the output device color profile 225 which includes appearance transform 225a, and other session-specific information 226. The input and output device profiles 224 and 225 are typically arranged as computer files stored on a memory medium such as disk 45 and include information about the input and output devices such as the appearance transform, gamut boundary descriptors and other information usable in a color management process. Based on one or more of these inputs, the current color management session is characterized by block 221. For example, the input device profile and/or the output device profile may include gamut boundary descriptors as signified respectively at 224b and 225b. Based on the gamut boundary descriptors, block 221 may characterize the current color management session based on differences between the input color gamut as defined by boundary descriptor 224b and the output color gamut as defined by boundary descriptor 225b. The difference between these gamuts signifies the extent to which gamut mapping is needed, and may result in situations where no gamut mapping is necessary, moderate gamut mapping is necessary, or significant gamut mapping is necessary. Such information is provided to block 227 which customizes a customizable gamut mapping algorithm (GMA) so as to yield customized GMA 228.

As another example, block 221 may extract the color content of image data 222 so as to determine the extent to which gamut mapping is needed so as to fit the color image data 222 into the output device gamut, which may be defined by gamut boundary descriptor 225b. Again, such information is provided to block 227, which customizes a customizable GMA so as to produce customized GMA 228.

As yet a further example, other session-specific information from input 226 may be provided to block 221, with such examples of session-specific information including output conditions such as viewing conditions (color temperature, target audience, and the like), recording medium type (in the case of a printed output), and current environmental conditions (such as temperature) to the extent that such environmental conditions might affect resulting color output. Based on such session-specific information, block 221 characterizes the color management session and passes the characterization thereof on to block 227 which customizes the customizable GMA so as to result in customized GMA 228.

The foregoing examples are not to be construed as limiting; rather, it is to be understood that any suitable characterizations of the current color management session may be provided by block 221 so as to customize a customizable GMA. In particular, it is to be understood that one or a combination of more than one of the foregoing examples may be utilized in the characterization of the current color management session.

Examples of customizable GMAs to which the characterization is applied in block 227 are gamut mapping algorithms that depend on characteristics of the current color management session, such as GMAs that depend on a comparison between input and output device gamuts (such as the known GCUSP, CLLIN, and CARISMA algorithms), gamut mapping algorithms that depend on input image data, and gamut mapping algorithms that depend on current printing or viewing conditions or other session-specific conditions. In particular, the invention contemplates use of parameterized GMAs, where parameters for the GMA depend on information from the current color management session, as provided from block 221. Suitable GMAs for use in block 227 include GMAs that are mathematical expressions or a sequence of computer instructions, or GMAs that are embodied as one- or multi-dimensional look-up tables, or combinations of the foregoing, or any suitable transformation from one device gamut to anther device gamut.

Pre-processing phase 210 involves application of customized GMA 228 to one or more color transforms so as to result in a composited color transform that incorporates the customized GMA. In the example of FIG. 3, customized GMA 228 is post-applied to a direct or indirect result of transformation processing according to the input device appearance transform 224a. FIG. 3 illustrates optional other transforms 230 that are applied sequentially after transforms according to the input device appearance transform 224a. Such other transforms 230 might include, for example, transforms according to a color appearance model into a color appearance space, or transforms for aesthetic purposes such as a change in hue. The effect of transform processing according to input device appearance transform 224a and/or optional other transforms 230 is to obtain a transformation from an input device colorant space to a device independent color space or a perceptual color space. As shown at 210, customized GMA 228 is post-applied to such a transformation so as to result in composite transform 231.

The precise technique of how to post-apply customized GMA 228 to the direct or indirect result of transformation processing according to input device appearance transform 224a depends on the nature of the respective transforms involved. For example, in a situation wherein input device appearance transform 224a and customized GMA 228 are both stored as mathematical expressions, composite transform 231 is most conveniently formed as a multi-dimensional look-up table formed of an N×N×N grid of equally spaced values in the input colorant space. Entries in each grid correspond to the result of mathematical and sequential processing of each equally spaced point in the input colorant space, first by the input device color appearance transform and then by the customized GMA. The result will ordinarily be in a device independent or perceptual color space, such as a profile connection space (PCS) or the CIECAM97s color space (whose coordinates are Jch or Jab).

In an alternative example, where input device appearance transform 224a is stored as a one- or multi-dimensional look-up table, and customized GMA 228 is stored as a mathematical expression, composite transform 231 is most conveniently formed as a multi-dimensional look-up table in which each entry in the input device appearance transform 224a is replaced by a transformation of the entry through application of the customized GMA.

Reverting to FIG. 3, data processing phase 220 involves transformation of input image data 222 first through composite transform 231 and thence through output device appearance transform 225a so as to result in output data 232 in the output colorant space. As shown in FIG. 3, it is also possible to provide optional other transforms 234, such as transforms complementary to transforms 230. For example, in a situation where transform 230 is a color appearance model and yields results in a perceptual color space, transform 234 might pre-apply an inverse color appearance model so as to transform to a color space suitable for input to the output device appearance transform 225a.

Figure 4:
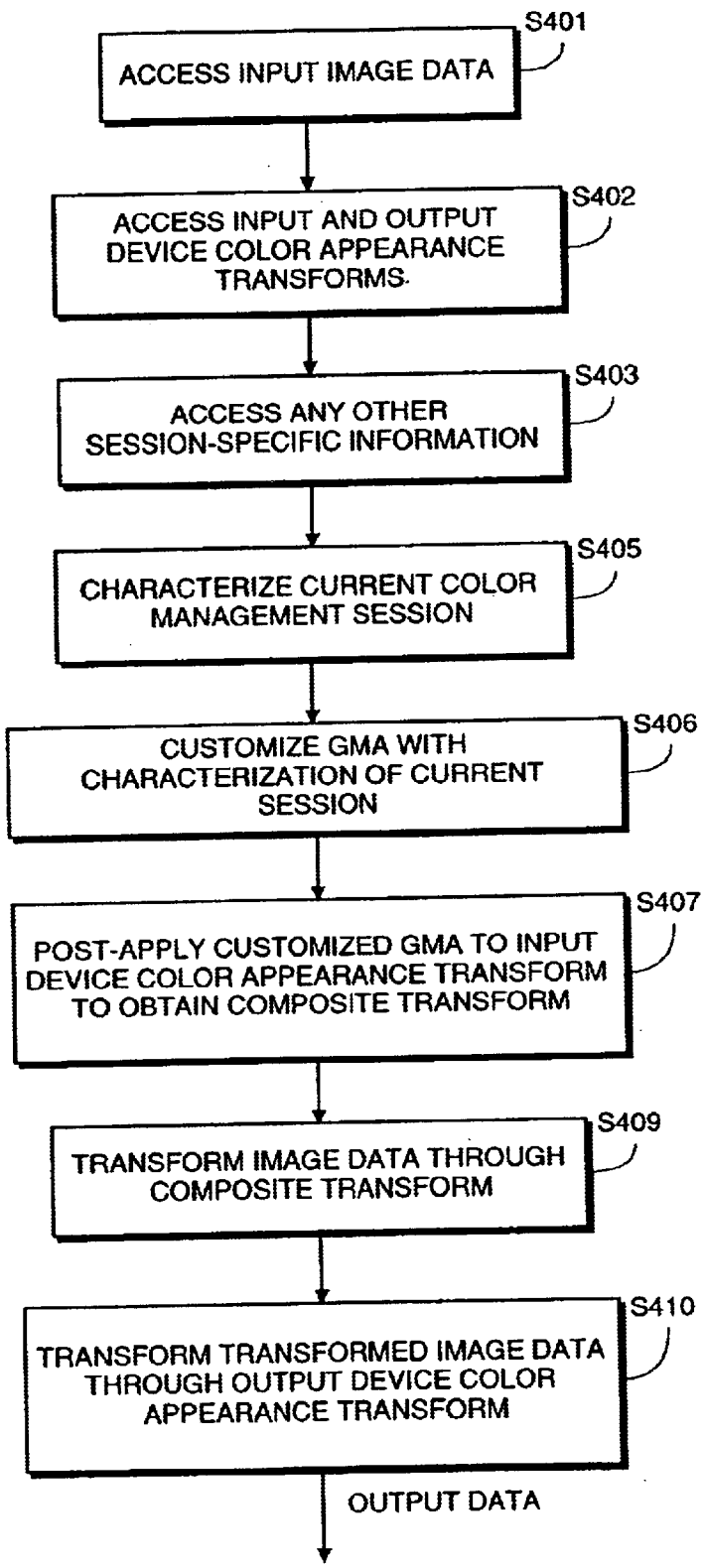
FIG. 4 is a detailed flow diagram illustrating the sequence of steps performed by the color management module of FIG. 3.

FIG. 4 is a detailed flow diagram illustrating the sequence of steps performed by color management module 144 according to the functional block diagram shown in FIG. 3.

The process steps illustrated in FIG. 4 are stored as computer executable process steps executable by CPU 113 and stored on a computer readable medium such as disk 45. Briefly, according to the process steps shown in FIG. 4, color management uses input and output device appearance transforms together with a customizable gamut mapping algorithm so as to transform input color data from an input colorant space to output color data in an output colorant space, and includes customization of the gamut mapping algorithm based at least in part on the current color management session, and application of the customized gamut mapping algorithm with other transforms such as the input or output device appearance transform, or both, so as to result in a composited transform that incorporates the customized gamut mapping algorithm. Thereafter, the input image data is transformed from the input colorant space to the output colorant space using the composited transform together with any additional transforms needed to complete the transformation.

In more detail, in steps S401 through S403, the input image data, the input and output device appearance transforms, and any other session-specific information, are accessed so as to characterize the current color management session (step S405). As mentioned previously with respect to characterization processing by block 221, not necessarily all of the above are needed to characterize a current color management session. Thus, it is possible for characterization processing in step S405 to characterize the current color management session based on less than all of the input image data, the input and output device appearance transforms, and other session-specific information. In addition, it is possible for characterization processing in step S405 to characterize the current color management session based on information contained or inferable from the above; for example, it is possible for characterization processing in step S405 to characterize the color management session based on gamut boundary descriptors stored together with the input and output device appearance transforms.

Flow proceeds then to step S406 in which a customizable GMA is customized with the characterization of the current session. Customizing step S406 proceeds, for example, by a supply of parameters from characterization processing step S405 to a parameterized GMA, so as to result in a customized GMA.

Flow then proceeds to step S407 in which the customized GMA is applied to the input device appearance transform, or to a transformed result of the input device appearance transform, so as to obtain a composite transform that incorporates the customized GMA. As mentioned previously, the composite transform may be obtained in the form of a look-up table such as a look-up table in which values from the input device appearance transform have been replaced by gamut-mapped values from the customized GMA. Alternatively, it is possible to obtain a composited transformation in equation form, or in any other format by which a composite transform that incorporates the customized GMA is obtained. It is further to be understood that the customized GMA might not be applied to a direct result of the input device appearance transform transformation, but rather applied to an indirect result thereof, such as a result that has been further processed by optional other transforms 230 (see FIG. 3).

Flow then advances to step S409 in which the input color image data is transformed through the composite transform, so as to obtain gamut-mapped and transformed input image data in an intermediate color space such as a perceptual color space or a device independent color space. The transformed image data in the intermediate color space is thereafter transformed (step S410) through the output device appearance transform, together with any other optional transforms 234 (see FIG. 3) that might be desired or needed to complete the transformation of the input image data in the input colorant space to output image data in an output colorant space.

Figure 5:
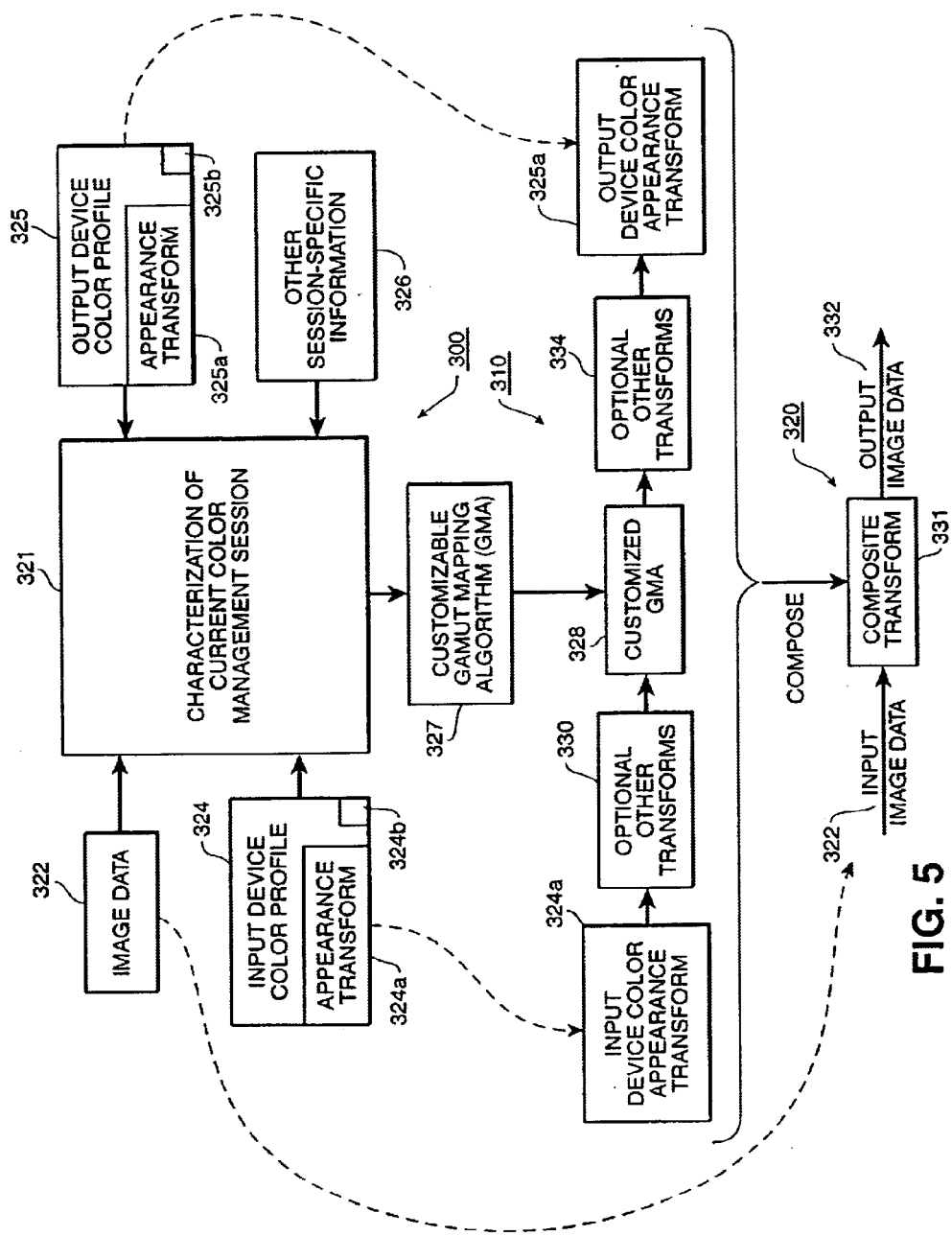
FIG. 5 shows a functional block diagram illustrating functionality of a further embodiment of the invention.

FIG. 5 shows a functional block diagram of a further embodiment of the invention. One way that the functional block diagram of FIG. 5 differs from that of FIG. 3 is in the nature of the composite transform that is obtained during the pre-processing phase: in the FIG. 3 embodiment, the composite transform is a partial transform that transforms from an input colorant space to an intermediate colorant space, whereas in FIG. 5 the composite transform is a complete transform that transforms, in a single transformation, from an input colorant space to an output colorant space.

In FIG. 5, blocks having functions similar to those in FIG. 3 have received similar reference numbers. Thus, three functional phases are shown: a customization processing phase 300 that customizes a customizable gamut mapping algorithm for the current color management session, a pre-processing phase 310 that composes a composite transformation so as to obtain, in a single transform, a transformation from input colorant space to output colorant space, and a data processing phase 320 in which image data is transformed through the composite transform to yield output data in an output colorant space.

In pre-processing phase 310, the composite transform that is obtained is a composite transform from input colorant space all the way through to an output colorant space, utilizing at least the input device appearance transform 324a, the customized GMA 328, and the output device appearance transform 325a. As shown in FIG. 5, optional other transforms may also be applied, such as transforms 330 and 334 that apply a color appearance model and complement thereof, respectively.

Figure 6:
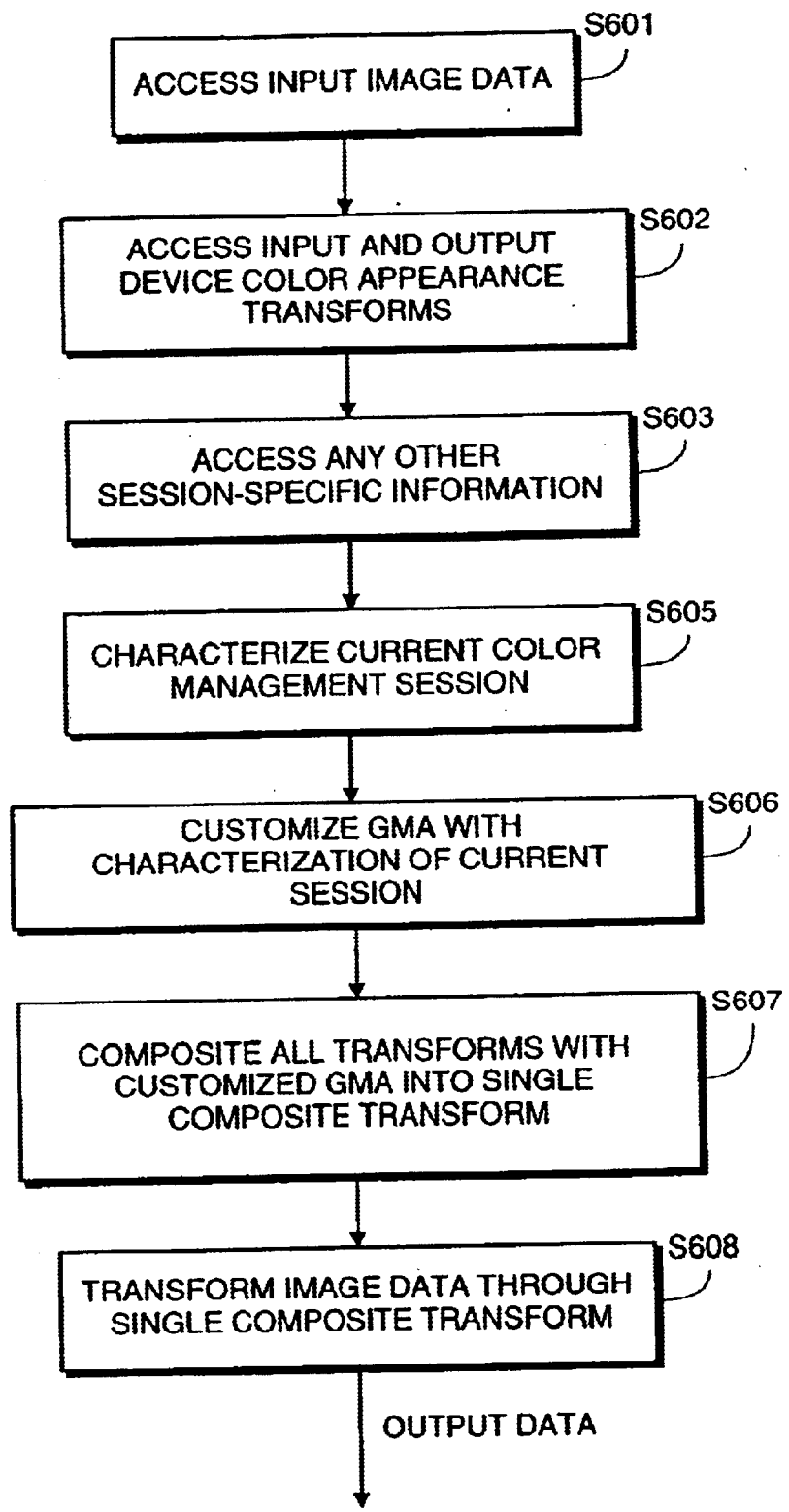
FIG. 6 is a flow diagram illustrating the sequence of step performed by the color management module of FIG. 5.

FIG. 6 is a flow diagram corresponding to the functional block diagram of FIG. 5. Steps S601 through S606 are similar to steps S401 through S406, respectively, of FIG. 4. In step S607, all transforms are composited with the customized GMA so as to yield a single composite transform (such as composite transform 331 is FIG. 5) that transforms from an input colorant space to an output colorant space. Thereafter, in step S608, the input color image data is transformed through the single composite transform so as to yield output data in the output colorant space.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A color management method using an input device appearance transform and an output device appearance transform together with a customizable gamut mapping algorithm, said method comprising the steps of:
    obtaining the input device appearance transform and the output device appearance transform based on each of input device color profile and an output device color profile;
    customizing the gamut mapping algorithm based on information in regard to the gamut mapping;
    compositing the customized gamut mapping algorithm with either the input device appearance transform and a color appearance model transform or the output device appearance transform and an inverse color appearance model transform, or both;
    generating an appearance look-up table; and
    transforming image data from an input colorant space to an output colorant space using the composited transform,
    wherein said gamut mapping algorithm operates in a perceptual color space, said perceptual color space is obtained by using the color appearance model transform.

2. A method according to claim 1, wherein said customizing step customizes the gamut mapping algorithm based on the image data.

3. A method according to claim 1, further comprising the step of comparing between input and output device gamuts, wherein the information on the gamut mapping is the information on the result from the comparison.

4. A method according to claim 1, wherein the information in regard to the gamut mapping is information on the viewing condition.

5. A method according to claim 1, wherein the input device profile and the output device profile include gamut boundary descriptors, and wherein the customizing step customizes based on the gamut boundary descriptors.

6. Computer-executable process steps stored on a computer readable medium, said computer-executable process steps for transforming image data from an input colorant space to an output colorant space by using a composited transform of either the input device appearance transform and a color appearance model transform or the output device appearance transform and an inverse color appearance model transform, or both, said computer-executable process steps comprising process steps executable to perform a method according to claim 1.

7. A computer-readable medium which stores computer-executable process steps, the computer-executable process steps for transforming image data from an input colorant space to an output colorant space by using a composited transform of either the input device appearance transform and a color appearance model transform or the output device appearance transform and an inverse color appearance model transform, or both, said computer-executable process steps comprising process steps executable to perform a method according to claim 1.

8. A color management system which uses an input device appearance transform and an output device together with a customizable gamut mapping algorithm, said system comprising:
    an obtaining processor that obtains the input device appearance transform and the output device appearance transform based on each of an input device color profile and an output device color profile;
    a customization processor that customizes the customizable gamut mapping algorithm based on information in regard to gamut mapping;
    a pre-processor that composites either the input device appearance transform and a color appearance model transform or the output device appearance transform and an inverse color appearance model transform, or both using the customized gamut mapping algorithm, and generates an appearance look-up table; and
    a data processor that transforms the image data from an input colorant space to an output colorant space using the composited transform,
    wherein the gamut mapping algorithm operates in a perceptual color space, said perceptual color space is obtained by using the color appearance model transform.

9. A color management method using an input device appearance transform and an output device appearance transform together with a customizable gamut mapping algorithm, said method comprising the steps of:

obtaining input device color profile and output device color profile, the input device color profile and the output device color profile each include a gamut boundary descriptor;

customizing the gamut mapping algorithm based on the gamut boundary descriptor of the input device color profile and the gamut boundary descriptor of the output device color profile;

compositing the customized gamut mapping algorithm with either the input device appearance transform for transformation between input device dependent color space and an intermediate color space, or the output device appearance transform for transformation between the intermediate color space and an output device dependent color space, or both appearance transforms, and generating a composited transform; and transforming image data from the input device dependent color space to the output device dependent color space using the composited transform, wherein the intermediate color space is other than the input and output device dependent color spaces.

10. A method according to claim 9, further comprising the step of comparing between input and output device gamut, wherein the customizing step customizes the gamut mapping algorithm based on a viewing condition.

11. A method according to claim 9, wherein the customizing step customizes the gamut mapping algorithm based on a viewing condition.

12. A computer-readable storage medium in which is stored a program for controlling a computer, said program comprising codes for permitting the computer to perform:

an obtaining step, for obtaining input device color profile and output device color profile, the input device color profile and the output device color profile each include a gamut boundary descriptor;

a customizing step, for customizing the gamut mapping algorithm based on the gamut boundary descriptor of the input device color profile and the gamut boundary descriptor of the output device color profile;

a compositing step, for compositing the customized gamut mapping algorithm with either the input device appearance transform for transformation between input device dependent color space and an intermediate color space, or the output device appearance transform for transformation between the intermediate color space and an output color space, or both appearance transforms, and generating a composited transform; and a transforming step, for transforming image data from the input device dependent color space to the output device dependent color space using the composited transform, wherein the intermediate color space is other than the input and output device dependent color spaces.

13. A color management method using an input device appearance transform and an output device appearance transform together with a customizable gamut mapping algorithm, said method comprising the steps of:

customizing the gamut mapping algorithm based on information in regard to the gamut mapping;

compositing the customized gamut mapping algorithm with either the input device appearance transform for transformation between an input device dependent color space and an intermediate color space, or the output device appearance transform for transformation between the intermediate color space and an output device dependent color space, or the both appearance transforms; and transforming image data from the input device dependent color space to the output device dependent color space, wherein the intermediate color space is other than the input and output device dependent color spaces, wherein the gamut mapping algorithm operates in a device independent color space, and wherein the input or output device appearance transform is implemented as a color lookup table.

14. A color management method according to claim 13, wherein the gamut mapping algorithm operates in both a device independent and a viewing-condition independent color space.

* * * * *

UNITED STATES PATENT AND TRADEMARK OFFICE
CERTIFICATE OF CORRECTION

PATENT NO. : 6,704,442 B2
DATED : March 9, 2004
INVENTOR(S) : John S. Haikin et al.

It is certified that error appears in the above-identified patent and that said Letters Patent is hereby corrected as shown below:

Column 3,
Line 66, "step" should read -- steps --.

Column 7,
Line 7, "anther" should read -- another --.

Column 9,
Line 61, "input" should read -- an input --.

Signed and Sealed this

Thirty-first Day of August, 2004

JON W. DUDAS
*Director of the United States Patent and Trademark Office*